Feb. 12, 1929. 1,701,759
G. A. MILLAR
GLASS WORKING MACHINE FOR SWITCHES
Filed Feb. 5, 1927 3 Sheets-Sheet 3
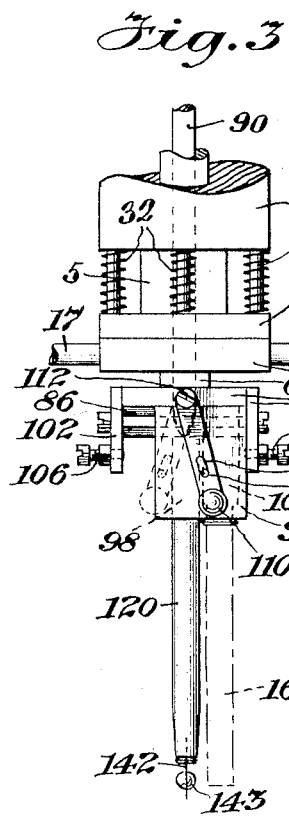
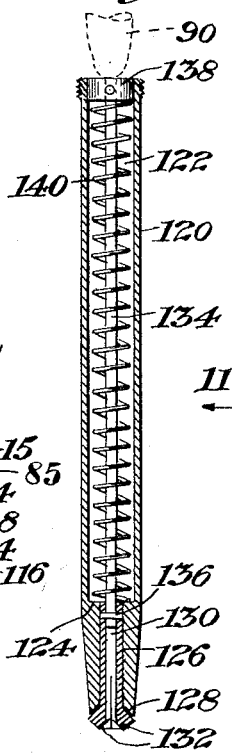
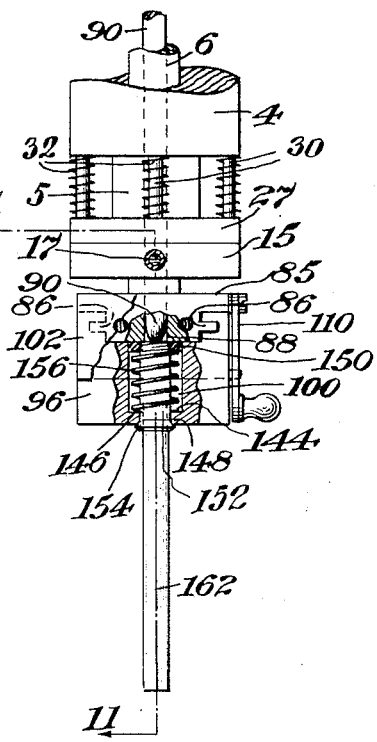
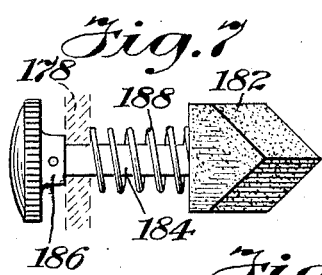
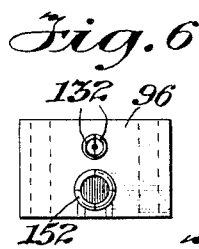
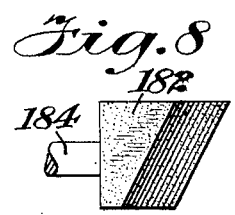
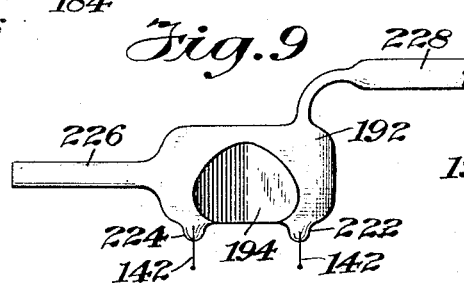
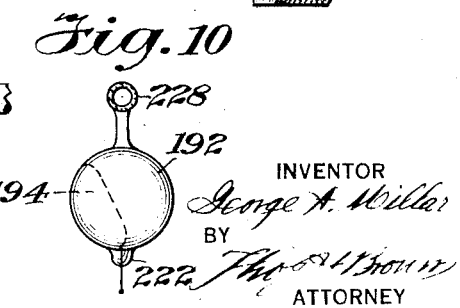
INVENTOR
George A. Millar
BY
ATTORNEY Patented Feb. 12, 1929.

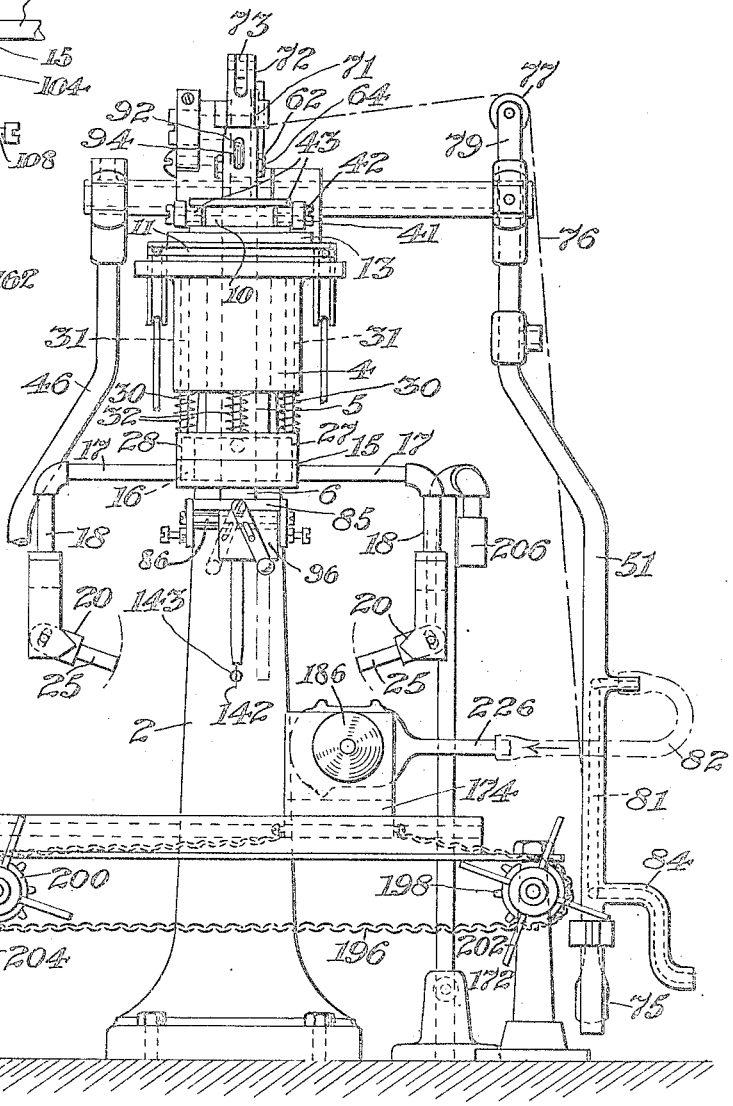

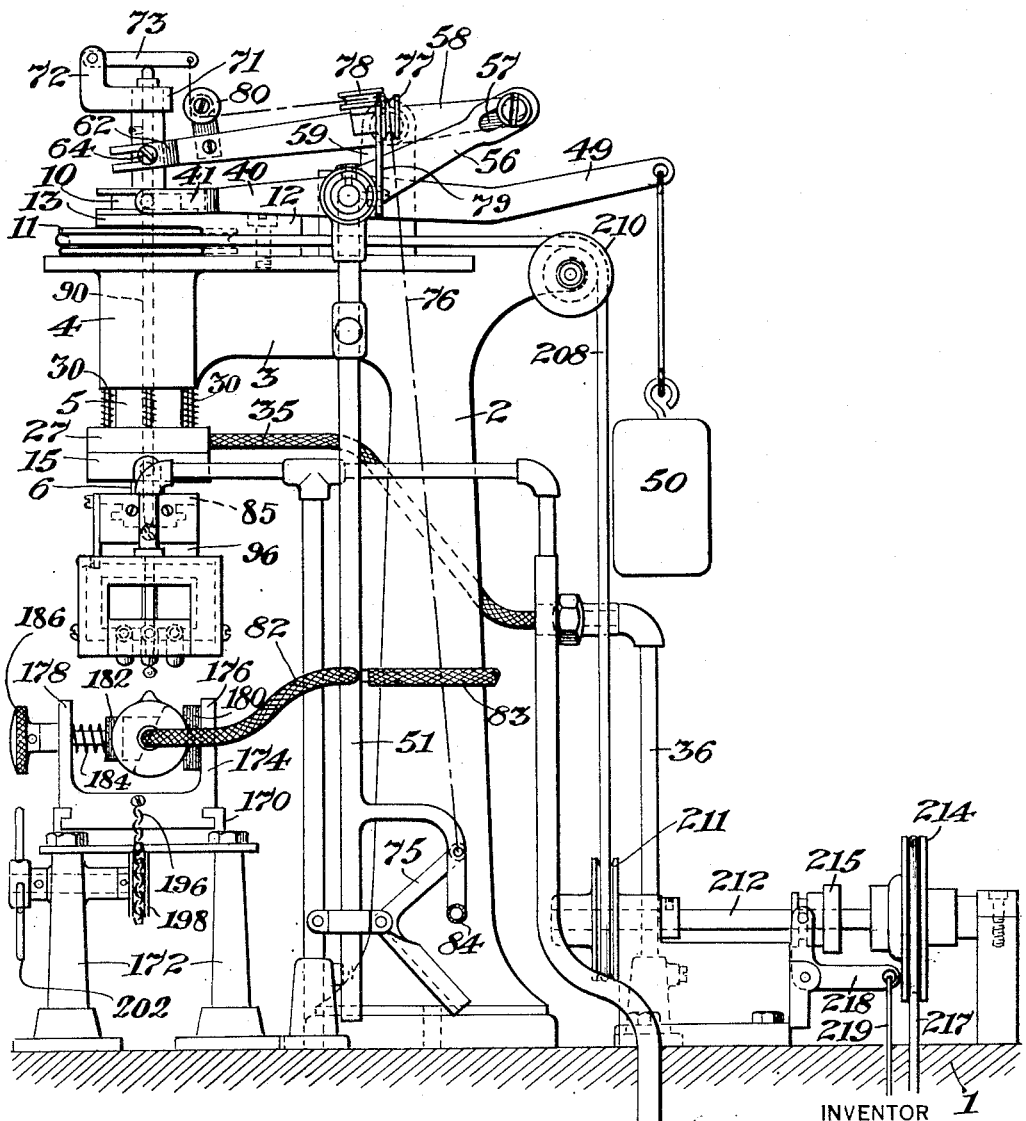

1,701,759

UNITED STATES PATENT OFFICE.

GEORGE A. MILLAR, OF RIDGEFIELD PARK, NEW JERSEY, ASSIGNOR TO COOPER HEWITT ELECTRIC COMPANY, OF HOBOKEN, NEW JERSEY, A CORPORATION OF NEW JERSEY.

GLASS-WORKING MACHINE FOR SWITCHES.

Application filed February 5, 1927. Serial No. 166,113.

The present invention relates to methods and apparatus for working glass into manufactured articles, and particularly for methods and means for making and blowing articles of hollow glassware having metal wires or similar parts sealed through the walls thereof and having other hollow glass parts joined thereto.

It is further an object of the invention to provide method and apparatus for working two glass parts to fuse them together and for sealing metal parts to or through glass walls to form an article of the character described, it is, of course, to be understood that the methods and apparatus of the invention are applicable generally in the arts.

Various other objects and advantages of the invention will be obvious from the following particular description of one form of apparatus and from the methods set forth embodying the invention or from an inspection of the accompanying drawings; and the invention also consists in certain new and useful methods and features of construction and combinations of parts hereinafter set forth and claimed.

In the accompanying drawings there is shown for purposes of illlustration one form of apparatus embodying the invention, in which Figs. 1 and 2 are front and side elevation views respectively of apparatus embodying the invention.

Figs. 3 and 4 are respectively front and side elevation views of work holding parts embodied in the apparatus of Figs. 1 and 2, Fig. 5 is a vertical sectional view showing still further details of work holding parts, Fig. 6 is a bottom plan view of work holding parts illustrated in Figs. 3 and 4, Figs. 7 and 8 are respectively plan and elevation views of other work holding parts, and Figs. 9 and 10 are respectively side and end elevation views of a mercury switch body having a glass tubulation formed thereon, as made by apparatus and method embodying the invention. Fig. 11 is a sectional view on line 11—11 of Fig. 4.

In the drawings the table 1 supports the standard 2 having the arm 3 projecting therefrom forwardly at its upper end. At its forward end said arm 3 supports the block 4 having slidably and rotatably mounted therethrough vertical hollow cylinder 5 through which in turn is slidably mounted the hollow shaft or spindle 6. At the upper end of cylinder 5 is mounted the annularly grooved double flange member 10. Slidably mounted on said cylinder 5 between member 10 and block 4 is mounted the pulley 11 which drives said cylinder 5 through a sliding key and keyway arrangement not shown but well known and common in the art. The member 12 fixed to the top of said arm 3 and having an extension 13 projecting over said pulley 11 serves with the upper end of block 4 to limit the movement of said pulley vertically. At the lower end of cylinder 5 is mounted the flange 15 concentrically therewith which has formed on its upper surface the annular channel 16 which connects with the pipes 17 mounted horizontally one on each side of said flange 15. Said pipes 17 carry at their outer extremities pipes 18 which connect therewith and therethrough said channel 16 and carry at their lower ends the hollow fire members 20, which carry fire nozzles 25, 25 directed inwardly and downwardly toward the axis of rotation of said shaft 5. About said cylinder 5 between head 4 and flange 15 is movably mounted the annular member 27 which rests on said flange 15 and has formed in its lower surface the channel 28 which registers with channel 16. The rods 30 fixed to the upper side of said ring 27 extend upwardly and fit slidably into the vertical holes 31 formed in said head 4 and serve to prevent rotation of said ring 27. During rotative movement of said flange 15 the compression springs 32 mounted about said rods 30 and pressing against said head 4 and said ring 27 serve to hold said ring 27 against said flange 15 to thereby secure a gas tight joint therebetween. Mounted to said head 27 and communicating with said channel 28 is one end of the flexible hose 35 the other end of which is connected to the pipe 36 which is in turn connected to a suitable source of gas supply not shown. On said arm 3 and back of said cylinder 5 is pivoted the arm 40 which carries at each of its fork tips 41 pin members 42 which project one on either side into the channel of member 10 and have mounted therein the roller member 43. Said arm 40 is connected at its pivot to the lever 46 which serves as a handle for raising and lowering the end of said arm 40 and thereby for raising and lowering said cylinder 5. The annular channel member 10 into which said pin members 42 engage provide actuating engagement between said arm 40 and said sleeve 5, when said sleeve 5 is rotated by means of the pulley 11 as hereinafter more fully described. Also fixed to said arm 40 at its pivot and extending backwardly is the arm 49 which carries at its outer end the counter weight 50 which tends to hold said cylinder 5 and thereby said burner members 20 at an upper limit of vertical movement.

The lever 51 is fixedly connected to the arm 56 which extends backwardly and upwardly and has formed therein near its outer end the longitudinal slot 57. Said lever 51 and arm 56 are pivoted at their juncture on said arm 3. Above said arm 40 is mounted the lever 58 which is pivoted between its ends at a point to the rear of the pivots of arms 40 and 56 and on the bracket member 59 carried by said standard 2. At its forward end said arm 58 carries the fork 62 which straddles the upper end of said shaft 6, each leg of said fork being itself formed into a fork and straddling the pin 64 mounted one on each side of said shaft 6.

Said hollow shaft 6 carries at its upper end member 71 which in turn carries a post 72 projecting upwardly at the front of said shaft 6 and having pivoted thereto the lever 73 which extends over and across the center of the end of the shaft 6 and terminates at a little distance therebeyond. For depressing said lever 73 the bell crank handle 75 is mounted at the handle end of the handle lever 51 and is connected to said lever 73 by means of a chain or thong 76 which passes over pulleys 77 and 78 mounted respectively on standard 79 at the pivoted end of handle lever 51 and on lever 58 near its pivot, and over the pulley 80 mounted below the end of lever 73 and on the lever 58 near its forked end.

At its lower end said handle lever 51 is hollow, having the longitudinal passageway 81 formed therein which at its upper end connects with flexible hose 82 and to a source of air pressure by the flexible hose 83, and at its lower end connects with an exhaust pipe 84 which terminates close to the handle of said crank 75 so that the operator can at the same time operate said handle 51 and control the air pressure in a body of hollow glass connected to said hose 82 by regulating the flow of air from said pipe 84.

Said hollow shaft 6 carries at its lower end the block member 85 having formed therein the horizontal slideways 86 which extend transversely of the front of the machine. Connecting and aligned with the central opening of said hollow shaft 6 is the vertical opening 88 through said block 85 and extending through said opening 88 and upwardly through said hollow shaft 6 is the spindle 90 which terminates above the upper end of said shaft 6 under said lever 73. In said hollow shaft 6 and about said spindle 90 is a spring, not shown, which tends to hold said spindle mounted at an upward limit of movement in which the lower end thereof is at or just above the lower end of said opening 88. A pin 92 fixed in said spindle 90 and extending through the longitudinal slot 94 in the side of said shaft 6 serves to limit the upward and downward movement of said spindle 90 in said hollow shaft 6.

Slidable in the channels 86, 86 of said block 85 is the block 96 which extends downwardly from block 85 and has formed therethrough the vertical circular passages 98, 100 which at different positions of said block 96 on the slideway of said block 85 register and align with said opening 88. At either end of said block 85 the plates 102 and 104 serve to limit the movement of said block 96 on said block 85. In said plates 102 and 104 the set screws 106 and 108 respectively serve to change the limits of movement of said block 96 on said block 85. A lever 110 pivoted to said block 85 by the screw 112 and having a longitudinal slot 114 therein through which extends the pin 116 fixed to said block 96 serves to slide said block 96 on said block 85 in either direction.

In said opening 98 and extending from the upper end thereof downwardly through and terminating below said block 96 is the sleeve 120 which at its upper end threads into said block 96 and forms with other parts therein described a chuck unit adapted for holding a piece of wire for example and operable by said spindle 90 by a downward movement thereof. Said sleeve 120 has extending from the upper end thereof a central opening 122 which terminates near the lower end at a shoulder 124 from which there extends to the lower end of the tube a smaller central opening 126, at which lower end there is formed a conical countersink 128. Slidable longitudinally in said opening 126 is the sleeve 130 which is of spring metal and which is split upwardly from its lower end and has formed thereat the clamping jaws 132, 132. The spring of said member 130 at the split portion tends to hold said jaws 132, 132 separate and said jaws 132, 132 have an outward conical surface having an angle equal to or greater than the angle of said countersink 128 so that movement of said member 130 in said opening 126 to bring the outer conical surface of said jaws 132, 132 against the surface of said countersink 128 will cause a movement of said jaws toward each other. A rod 134 fixed to said member 130 by the pin 136 and extending upwardly through said opening 122 carries at its upper end near the top of said sleeve 120 the plug 138 fixed thereto and slidable in the bore of said sleeve 120. A compression spring 140 having its upper end bearing against the lower side of said plug 138 and having its lower end bearing against said shoulder 124 tends to hold said chuck jaws 132 in the closed position. In Fig. 3 is shown held by said jaws 132 the wire 142 which has formed thereon the glass bead 143.

Said opening 100 extends downwardly from top surfaces of said block 96 and terminates at a shoulder 144 from which extends downwardly the bore 146 to which from the lower surface of block 96 extends the counter sink surface 148. Into the upper end of said opening 100 is mounted the slidable plug or collar 150 having a central bore aligned with said bore 146. Threaded in the bore of said plug 150 is the sleeve 152 which at its upper end is closed and at its lower end is split to form clamping jaws and has the enlarged conical flange 154 adapted to be engaged by said counter sink 148 for the closing of said jaws. Said sleeve 152 is formed to normally tend to move apart at the split portions to separate said jaws. A compression spring 156 mounted about said sleeve 152 has its lower end pressing against said shoulder 144 and its upper end pressing against the collar 150 threaded onto said sleeve 152 tends to move said sleeve 152 upwardly to hold the clamping jaws thereon in a closed position. The bore of said sleeve 152 at the jaw members thereof is of a size to admit the insertion and the clamping in the closed position thereof of a piece of glass tubing 162 for example.

As indicated in Fig. 3 at one position of said handle 110, the upper end of said sleeve 152 is in operative relation to said spindle 90 and in the other position of said handle 110 said plug 138 is in operative relation to said spindle 90. In these positions downward movement of said spindle 90 through depression of said lever 73 by said crank handle 75 moves said sleeve 152 and said sleeve 130 respectively into a position to permit the opening of the jaws thereof.

Below said fires 25, 25 and the clamping device carried by said shaft 6 is the bed plate 170 supported by the posts 172, 172 and extending transversely past said standard 2. Slidable on said plate 170 is the block 174 which has a rear upwardly extending plate 176 and a forward upwardly extending plate 178 which face each other. Said plate 176 carries the horizontal V block 180 which is of suitable material either metal or hard asbestos or the like, and said plate 178 carries a co-operating block 182 on the pin 184 which extends through said plate 178 and which has on its outer end the handle 186. A compression spring 188 which bears at one end against the inner face of said plate 178 and at its other end against the block 182 tends to hold said block 182 in a limited position towards said V block 180 and permits by means of said handle 186 the movement of said block 182, away from said V block 180. By means of said handle 186 said block 182 can be rotated about the horizontal axis of said pin 184. The clamping surface of said block 182 is in the form of a wedge whose outer edge is at an angle from the vertical. These particular forms of clamping members are used to accommodate the mercury switch body of Figs. 9 and 10 which has an envelope 192 with a V shaped depression 194 formed in the sides thereof. When clamped between members 180 and 182 the side opposite depression 194 is positioned in the V groove of block 180 and the block 182 is held by said spring 188 in said depression 194. A chain 196 is used to move said block 174 on said plate 170. One end of said chain 196 is attached to one end of said block 174 from which it extends over a sprocket 198 at one end of said plate 170 from which is passes over the sprocket 200 at the other end of said plate 170 and from there to the other side of said block 174 the members 202 and 204 serving to rotate the members 198 and 200 respectively for sliding said block 174 on said plate 170. At and over one end of said plate 170 is mounted the downwardly extending gas jet 206 used for puncturing hollow glassware.

Rotational movement is imparted to said fires 25, 25 by means of said pulley 11 which is in turn actuated through the belt 208 passing over pulleys 210 through pulley 211 mounted on counter shaft 212 which in turn is driven by the pulley 214 which connects therewith through clutch 215, said pulley 214 being actuated through belt 217 by a suitable motive source not shown. Said clutch 215 is moved into and out of engagement with said pulley 214 by mean of the bell crank 218, connected by rod 219 to a suitable actuating means such as a pedal not shown.

The use and operation of the invention as embodied in the above described machine will be described for receiving a switch body such as the envelope 192 which has the said depression 194, pockets or cups 222 and 224 formed in the side thereof one at either end of said depression 194 and also has formed thereon and axially aligned therewith the tubulation 226, for the purpose of attaching to the body thereof at a point opposite said cup 222 the tubulation 228 and for sealing through the envelope wall at each of said pockets 222, 224 a wire 142. During this process with a blank envelope 192 mounted between said block 180 and 182 with said cups 222, 224 extending upwardly said tubulation 226 is connected to said hose 82. Said body is then moved to a position in which one of said cups 222 or 224 is directly under said jet 206 which is caused to impinge thereon and melt the glass thereat which is blown out by increasing the air pressure in the body 192 by restricting the flow of air from said pipe 84. A wire 142 with a glass bead 143 thereon being held in said clamping jaws 132 and 132 said block is moved to bring the cup which has had an opening blown therein in alignment below said wire 142 which by means of said handle 51 is moved downwardly to extend through said opening and to bring the glass bead 143 close to the glass of switch body 192 at the blown out portion thereof. The fires from said jets 25, 25 are then raised to fuse said glass bead 143 and the glass of the envelope 192 at said opening, and by further movement of said handle 51 and by regulation of the air pressure in said switch body 192 through said tube 84 the fused glass is worked in a manner well known in the art to seal said glass bead 143 to the wall of the envelope 192 to form a sealed closure about said wire 142. The switch body 192 is then moved back under said jet 206 to blow out the glass at the other of said cups 222, 224 after which another wire 142 is sealed in thereat in the manner described. The switch body 192 is then inverted between said blocks 180 and 182 said block 182 being reversed by rotating it on said pin 184 to properly clamp said body 192. The body 192 is then brought under said jet 206 and an opening blown therethrough diametrically opposite from said cup 222 said lever 110 is then moved to bring said sleeve 152 under said pin 90 and the glass tube 162 is clamped therein. Through said handle 46 the lower end of said tube 162 is aligned with the opening blown in the side of said body 192 and which has been moved over in alignment with tube 162 and the fires from said jets 25, 25 raised to melt the glass thereat which is now worked in the usual manner to form a tubulation 228 on the body 192.

After these operations said tubulation 226 is sealed off by hand or by machine, the body 192 provided with a suitable quantity of mercury and properly exhausted of deleterious gases and when desired provided with inert gas such as hydrogen and the switch body closed by sealing off at said tubulation 228.

While I have shown and described and have pointed out in the annexed claims certain novel features of the invention, it will be understood that various omissions, substitutions and changes in the forms and details of the device illustrated and in its use and operation for performing different glass working operations and for joining different shaped glass parts may be made by those skilled in the art without departing from the spirit of the invention.

I claim:

1. In glass working machinery, in combination, a plurality of sets of chuck jaws, means for each set tending to hold the jaws thereof in the open position, confining means for causing the jaws of each set to move into the closing position, means tending to move said jaws into their respective confining means, and a single means for moving said sets of jaws separately at will from their respective confining means to permit the opening thereof, said moving means being movable relatively into and out of position for operating either of said sets of jaws.

2. In glass working machinery, in combination, a plurality of sets of chuck jaws, means for each set tending to hold the jaws thereof in the open position, means for each set and in operable relation therewith for closing said jaws, means tending to move said jaws and said closing means relative to each other into jaw closing relation, and a single means movable relatively into operable relation to any of said sets of jaws adapted for moving said sets of jaws separately from the closed position into the open position thereof.

3. In glass working machinery, in combination, a work holder movable longitudinally along a given line, a second work holder movable transversely of said line, first said work holder comprising a plurality of sets of chuck jaws, means for each set tending to hold jaws thereof in the open position, means for each set and in operable relation therewith for closing said jaws, means tending to move said jaws and said closing means relative to each other into jaw closing relation, and a single means movable relatively into operable relation to any of said sets of jaws adapted for moving said sets of jaws separately from the closed position into the open position thereof.

4. In glass working machinery, in combination, a work holder movable longitudinally along a given line, a second work holder movable transversely of said line, first said work holder comprising a plurality of sets of chuck jaws, means for each set tending to hold jaws thereof in the open position, means for each set and in operable relation therewith for closing said jaws, means tending to move said jaws and said closing means relative to each other into jaw closing relation, and a single means movable relatively into operable relation to any of said sets of jaws adapted for moving said sets of jaws separately from the closed position into the open position thereof and a set of fires, said work holders and said fires being movable relatively with each other into and out of operative relation.

5. In glass working machinery, in combination, a work holder movable longitudinally along a given line, a second work holder movable transversely of said line, first said work holder comprising a plurality of sets of chuck jaws, means for each set tending to hold jaws thereof in the open position, means for each set and in operable relation therewith for closing said jaws, means tending to move said jaws and said closing means relative to each other into jaw closing relation, and a single means movable relatively into operable relation to any of said sets of jaws adapted for moving said sets of jaws separately from the closed position into the open position thereof, each of said sets of jaws being adjustable transversely of said line of movement while in operative relation with said jaw opening means.

6. In glass working machinery, in combination a slide block, a chuck carrying block movable on first said block, a plurality of sets of chuck jaws mounted to second said block, means for each set tending to hold jaws thereof in the open position, means for each set and in operable relation therewith for closing said jaws, means tending to move said jaws and said closing means relative to each other into jaw closing relation, and a single means adapted for moving said sets of jaws separately from the closed position into the open position thereof, said sets of chucks being movable by second said block separately into operable relation to said means for moving the chucks into the opening position.

7. In glass working machinery, in combination, a work holder movable longitudinally along a given line, a second work holder movable transversely of said line, first said work holder comprising a slide block, a chuck carrying block movable on first said block, a plurality of sets of chuck jaws mounted to second said block, means for each set tending to hold jaws thereof in the open position, means for each set and in operable relation therewith for closing said jaws, means tending to move said jaws and said closing means relative to each other into jaw closing relation, and a single means adapted for moving said sets of jaws separately from the closed position into the open position thereof, said sets of chucks being movable by second said block separately into operable relation to said means for moving the chucks into the opening position.

8. In glass working machinery, in combination, a work holder movable longitudinally along a given line, a second work holder movable transversely of said line, first said work holder comprising a slide block, a chuck carrying block movable on first said block, a plurality of sets of chuck jaws mounted to second said block, means for each set tending to hold jaws thereof in the open position, means for each set and in operable relation therewith for closing said jaws, means tending to move said jaws and said closing means relative to each other into jaw closing relation, and a single means adapted for moving said sets of jaws separately from the closed position into the open position thereof said sets of chucks being movable by second said block separately into operable relation to said means for moving the chucks into the opening position, and a set of fires, said work holders and said fires being movable relatively with each other into and out of operative relation.

9. In glass working machinery, in combination, a work holder movable longitudinally along a given line, a second work holder movable transversely of said line, first said work holder comprising a slide block, a chuck carrying block on first said block, a plurality of sets of chuck jaws mounted to second said block, means for each set tending to hold jaws thereof in the open position, means for each set and in operable relation therewith for closing said jaws, means tending to move said jaws and said closing means relative to each other into jaw closing relation, and a single means adapted for moving said sets of jaws separately from the closed position into the open position thereof, said sets of jaws being movable by chuck carrying block transversely of said line of movement to bring either of said sets into operative relation with said means for moving the chucks into the opening position.

10. In glass working machinery, in combination, a work holder movable longitudinally along a given line, a second work holder movable transversely of said line, first said work holder comprising a slide block, a chuck carrying block on first said block, a plurality of sets of chuck jaws mounted to second said block, means for each set tending to hold jaws thereof in the open position, means for each set and in operable relation therewith for closing said jaws, means tending to move said jaws and said closing means relative to each other into jaw closing relation, and a single means adapted for moving said sets of jaws separately from the closed position into the open position thereof, said sets of jaws being movable by chuck carrying block transversely of said line of movement to bring either of said sets into operative relation with said means for moving the chucks into the opening position, said sets of jaws being adjustable transversely of said line of movement while in such said operative relation.

Signed at Hoboken, in the county of Hudson and State of New Jersey, this 2nd day of February, A. D. 1927.

GEORGE A. MILLAR.